United States Patent [19]
Turner

[11] 3,972,236
[45] Aug. 3, 1976

[54] INTERNAL TEMPERATURE REFERENCE CIRCUIT FOR ELECTRONIC THERMOMETER

[75] Inventor: Robert Bruce Turner, Weymouth, Mass.

[73] Assignee: American Medical Electronics Corporation, Weymouth, Mass.

[22] Filed: May 28, 1974

[21] Appl. No.: 473,495

[52] U.S. Cl. ............................................. 73/362 AR
[51] Int. Cl.[2] ......................................... G01K 7/20
[58] Field of Search .......................... 73/1 F, 362 AR

[56] References Cited
UNITED STATES PATENTS

| | | | |
|---|---|---|---|
| 2,938,385 | 5/1960 | Mack et al. | 73/362 AR |
| 3,377,862 | 4/1968 | Gheorghiu | 73/362 AR |
| 3,530,718 | 9/1970 | Ehlo | 73/362 AR |
| 3,872,728 | 3/1975 | Joyce et al. | 73/362 AR |

Primary Examiner—Richard E. Aegerter
Assistant Examiner—Willis Little
Attorney, Agent, or Firm—Joseph S. Iandiorio

[57] ABSTRACT

In an electronic thermometer system having an electronic thermometer unit and a temperature sensing probe unit having an electrical characteristic which varies as a function of the temperature to which it is exposed, an internal temperature reference circuit including a probe matching circuit having the same characteristic matched to that of the probe unit at a predetermined test temperature and a switching mechanism for selectively interconnecting the probe unit and probe matching circuit with the thermometer unit.

3 Claims, 3 Drawing Figures

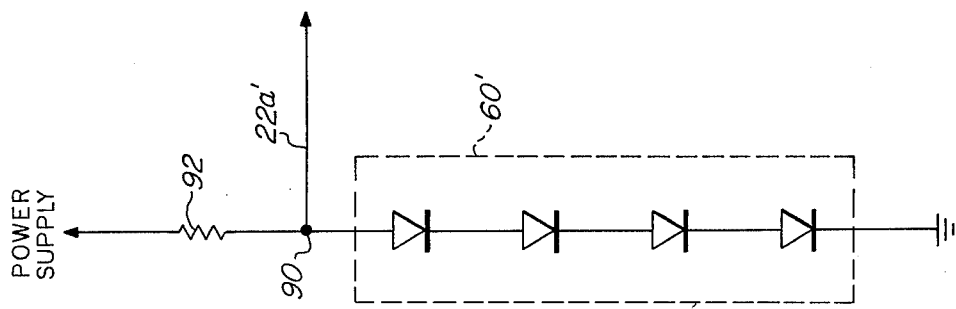
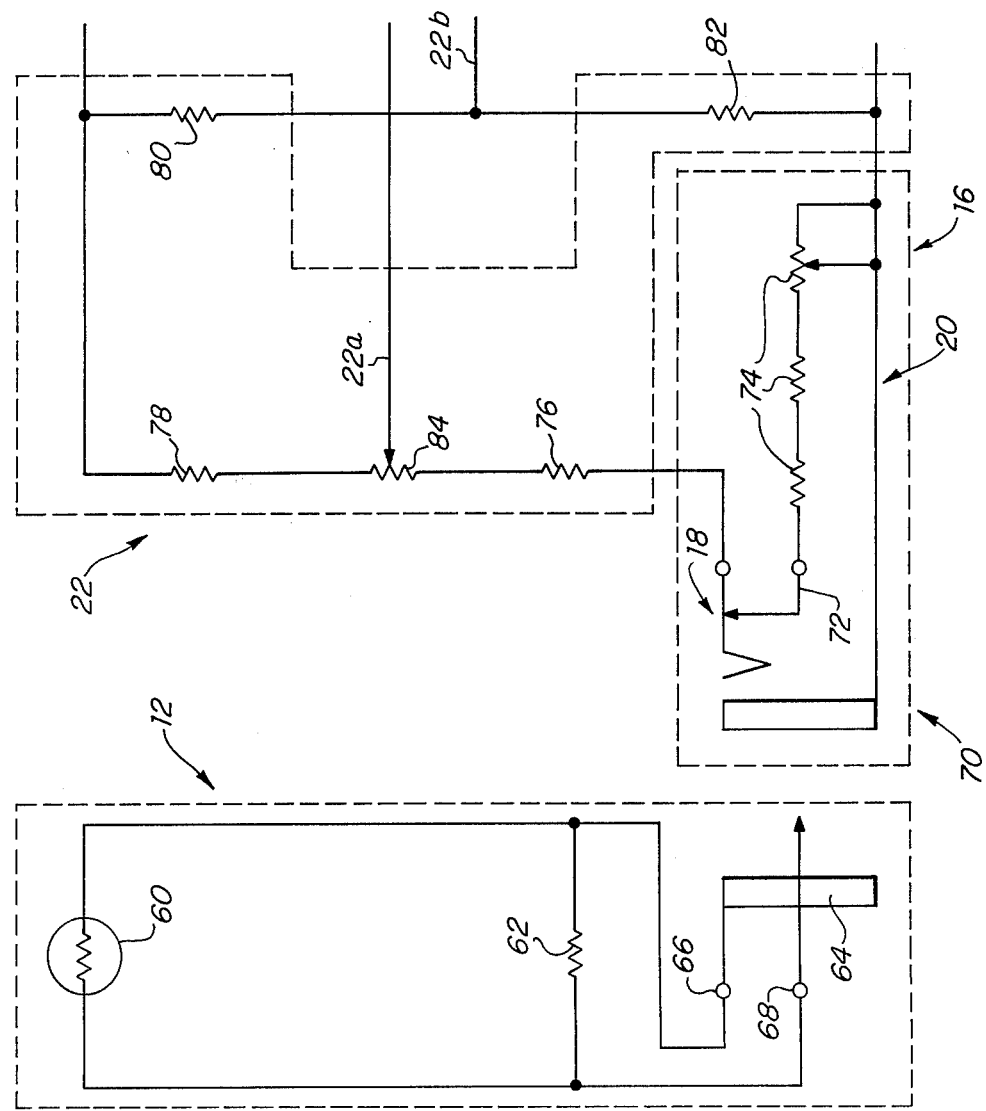
FIG. 3.
FIG. 2.

INTERNAL TEMPERATURE REFERENCE CIRCUIT FOR ELECTRONIC THERMOMETER

FIELD OF INVENTION

This invention relates to an internal temperature reference circuit for an electronic thermometer system and more particularly to such a circuit which automatically is connected to the thermometer unit input whenever the temperature sensing probe unit is disconnected from that input.

BACKGROUND OF INVENTION

Recent advances in technology have resulted in production of improved electronic thermometers for measuring a patient's temperature. Typically such systems include the electronic thermometer unit and a plug-in temperature sensing probe unit which may be used with disposable covers. These systems are initially relatively expensive but over their useful life they cost considerably less to use and are less consuming of the time of scarce and expensive medical personnel. However, they are more complex than conventional thermometers and so require some means for simple and easy periodic verification of their accuracy. This is especially so where one system may be used to measure temperatures of dozens of patients by virtue of the use of disposable prove covers. Further, medical personnel have neither the ability nor the time to verify the accuracy or proper operation of a suspect thermometer system. Therefore the suspect system must be removed from service to await a field service technician or return to the manufacturer.

SUMMARY OF INVENTION

It is therefore an object of this invention to provide an improved electronic thermometer system having an internal temperature reference circuit for routinely, quickly and easily verifying the accuracy of the system.

It is a further object of this invention to provide such an improved system including a temperature sensing probe unit and electronic thermometer unit in which a malfunction can be quickly and easily determined to be in either the probe unit or thermometer unit.

It is a further object of this invention to provide such an improved system including a temperature sensing probe unit and electronic thermometer unit in which the internal reference circuit is immediately, automatically engaged upon disconnecting the probe unit.

The invention features an internal temperature reference circuit in an electronic thermometer system having an electronic thermometer unit and a temperature sensing probe unit having an electrical characteristic which varies as a function of the temperature to which it is exposed. The internal temperature reference circuit includes a probe matching circuit having the same characteristic matched to that of the probe unit at a predetermined test temperature and a switching mechanism for selectively interconnecting the probe unit and the probe matching circuit with the thermometer unit.

In preferred embodiments where the probe unit is releasably engageable with the thermometer the switching mechanism includes a jack switch for interconnecting the units and for automatically connecting the probe unit output to and disconnecting the matching circuit from the input to the thermometer unit when the probe unit is plugged into the thermometer unit and automatically connecting the matching circuit to the input of the thermometer unit when the probe unit is unplugged.

DISCLOSURE OF PREFERRED EMBODIMENT

Other objects, features and advantages will occur from the following description of a preferred embodiment and the accompanying drawings, in which:

FIG. 2 is a detailed schematic diagram of the probe, internal temperature reference circuit and bridge circuits of FIG. 1; and FIG. 3 is a schematic diagram of an alternative temperature sensing mechanism which may be used in the probe.

Figure 1:
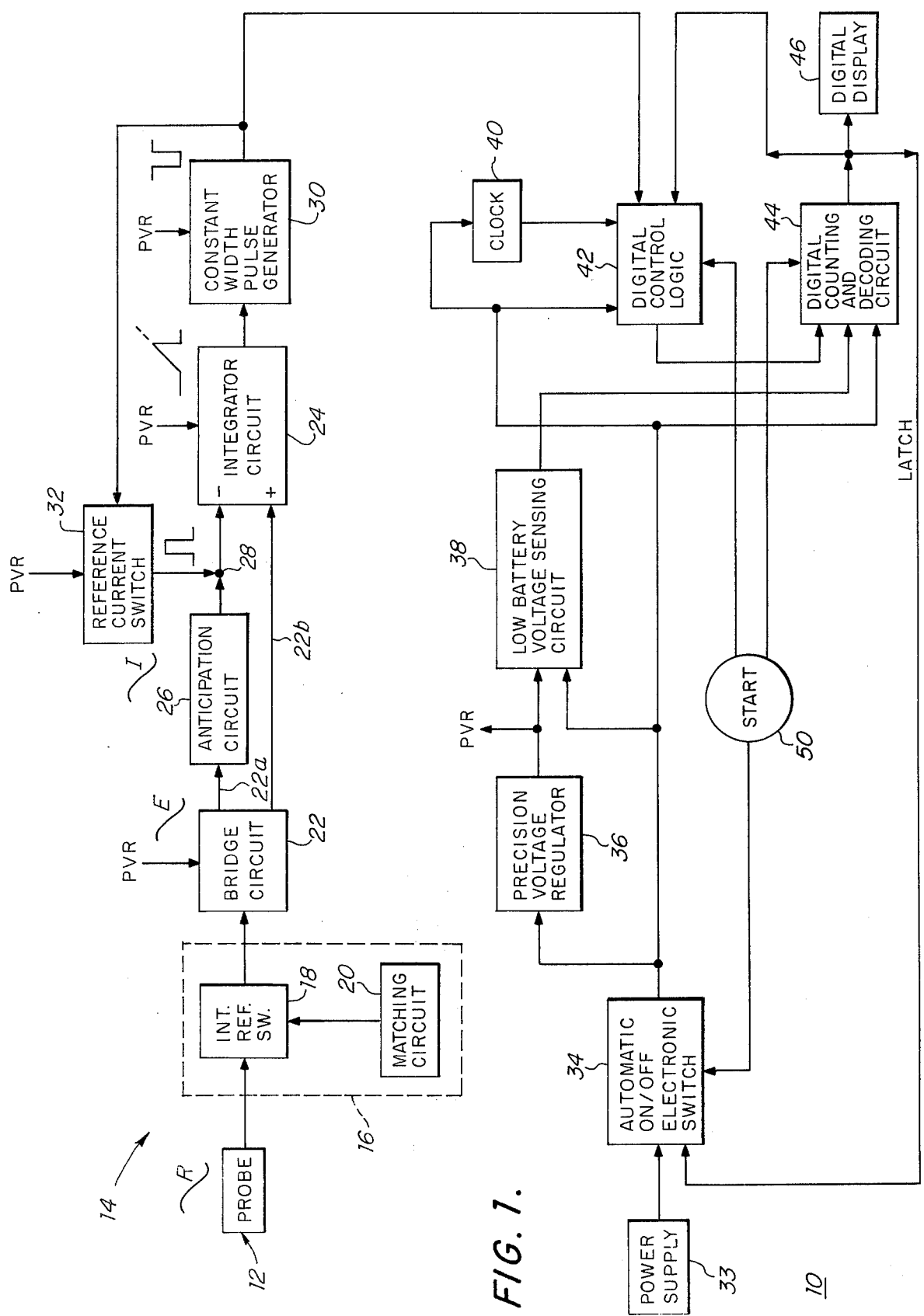
FIG. 1 is a block diagram of a thermometer system including an internal temperature reference circuit according to this invention.

The invention may be accomplished in an electronic thermometer system in which the probe unit includes a thermistor for sensing temperature. The thermistor in the probe unit constitutes one arm of a bridge circuit which senses any change in the resistance of the thermistor as a result of changes in temperature to which the thermistor is exposed. An internal reference circuit includes a matching circuit whose impedance matches that of the thermistor at some predetermined temperature and a switching mechanism for connecting the matching circuit in parallel with the thermistor arm of the bridge. The switching mechanism connects either the thermistor or the matching circuit into the bridge network. When the thermometer system is used to measure the body temperature of humans it is useful to set the predetermined reference temperature at 98.6°F.

In one preferred embodiment the switching mechanism is part of a plug-in unit by which the probe unit attaches to the electronic thermometer unit. When the probe unit is plugged into the thermometer unit, the thermistor is switched into the arm of the bridge circuit. When the probe unit is unplugged the matching circuit automatically replaces the thermistor and sets the bridge to respond as if the probe had sensed a temperature of 98.6°F.

The invention is not restricted to an impedance matching circuit in a bridge network. The probe unit may contain sensing means other than the thermistor which may exhibit other electrical characteristics that vary in response to temperature: current or voltage changes instead of impedance changes. For example, the thermistor may be replaced by one or more temperature sensitive diodes whose junction voltage varies with temperature to provide a voltage proportional to the temperature change to which the diodes are exposed. In that situation, the internal temperature reference circuit of this invention would be set to provide a voltage representative of the voltage which the diode or diodes produces when sensing a predetermined test temperature.

There is shown in FIG. 1 an electronic thermometer system 10 including a probe unit 12 and an electronic thermometer unit 14 which utilizes the internal temperature reference circuit 16 according to this invention including the internal reference switch 18 and matching circuit 20. The electronic thermometer unit 14 includes bridge circuit 22 whose reference output 22b is directed to the positive input of integrator circuit 24 and whose other output 22a is submitted through anticipation circuit 26 and summing point 28 to the negative input of integrator circuit 24. The output of integrator circuit 24 is a sawtooth signal which is submitted to the constant width pulse generator 30 which provides a negative going pulse of constant width at its output. This constant width pulse output is fed back to reference current switch 32 which produces a constant width pulse of constant amplitude at its output which is submitted to the summing point 28. All power in electronic thermometer unit 14 from power supply 33 is controlled by automatic on-off electronic switch 34. Precision voltage regulator 36 provides precisely regulated voltage to bridge 22, integrator circuit 24, constant width pulse generator 30 and reference current switch 32.

Low battery voltage sensing circuit 38 receives unregulated power from automatic on-off electronic switch 34 and regulated power from precision voltage regulator 36. Low battery voltage sensing circuit 38 is responsive to both regulated voltage from precision voltage regulator 36 and the unregulated voltage from automatic on-off electronic switch 34 to produce a signal to digital counting and decoding circuit 44 to extinguish the least significant digit of the temperature display in digital display 46 during the temperature display mode if the battery voltage decreases below some predetermined minimum level.

The remainder of the circuit including clock 44, digital control logic 42, digital counting and decoding circuit 44 and digital display 46 receives unregulated power directly from automatic on-off electronic switch 34.

In operation, when probe 12 senses an increase in temperature T the resistance of the thermistor R decreases proportionately. This decrease in resistance is sensed by bridge 22 which in response thereto produces a decreasing voltage E to anticipation circuit 26 that results in a decreasing current I from the output of anticipation circuit 26 at summing point 28 and the negative input to integrator circuit 24. Reference output 22b of bridge 22 connected to the positive input of integrator circuit 24 remains the same. The difference in the current conditions at the negative and positive inputs to integrator circuit 24 cause it to produce a positive slope ramp output. When the ramp reaches a predetermined threshold, constant width pulse generator 30 responds by producing a negative going pulse of constant width at its output. This pulse is fed back to reference current switch 32 which produces a constant width and constant amplitude positive pulse which it delivers to summing point 28 to offset the decrease in current at that point and restore the balance at the inputs to integrator circuit 24, which causes the voltage at its output to drop creating a sawtooth wave shape. When the pulse at summing point 28 ceases the difference in outputs 22a nd 22b once again prevails and integrator circuit 24 once again produces a positive slope ramp and another pulse is delivered to summing point 28. The greater the unbalance of bridge 22 the greater the number of these fixed width, fixed amplitude pulses required to maintain summing point 28 in balance. Since the width and amplitude of these pulses is constant it is the rate of these pulses which adjusts to accommodate the unbalance at summing point 28. Thus the rate of the pulses occurring at the output of constant width pulse generator 30 is proportional to the temperature being sensed by probe 12.

Anticipation circuit 26 accelerates the temperature sensing process by using the rate of change of the temperature being sensed by probe 12 to anticipate the final temperature level which will be sensed and to increase the current to summing point 28 in anticipation of that final temperature.

Electronic thermometer system 10 is actuated by operating start button 50 which resets digital control logic 42 and digital counting and decoding circuit 44 and turns on automatic on-off electronic switch 34. Digital counting and decoding circuit 44 provides a latch signal to the input of automatic on-off electronic switch 34 which keeps it in the on condition for a fixed period of time after start button 50 has been released.

The system first operates in its time display mode and then in its temperature display mode. In the time display mode digital control logic 42 passes pulses from clock 40 to digital counting and decoding circuit 44 which counts the pulses and displays the time in digital display 46 for each second of the time display period. Typically, the time display period is 20 seconds and digital display 46 will display each second from one to 19; at the end of the twentieth second, digital control logic 42 stops the flow of pulses from clock 40 to digital counting and decoding circuit 44 and thereafter, for the period of one pulse of clock 40, transmits the pulses from constant width pulse generator 30 received through AC coupling capacitor 52 to digital counting and decoding circuit 44. The number of constant width pulses counted by digital counting and decoding circuit 44 represents the number of pulses required to produce a balance at summing point 28 and is indicative of the temperature being sensed by probe 12.

Internal temperature reference circuit 16 including internal reference switch 18 and matching circuit 20 is shown in more detail in FIG. 2, in conjunction with probe 12 and bridge 22.

Probe unit 12 may include thermistor 60 and normalizing resistor 62 connected in parallel with resistor 60; normalizing resistor 62 is trimmed to make sure that each probe will have the same effective impedance in order to facilitate the interchange of probe units with electronic thermometer units. Internal reference switch 18 includes jack or plug 64 having its contacts connected to terminal 66 and 68 of the thermistor 60. The other part of internal reference switch 18 includes socket 70 and switch 72, one end of which is connected to matching circuit 20 which includes one or more resistors 74, at least one of which is adjustable for simulating a predetermined test temperature.

When plug 64 is removed from socket 70, as shown in FIG. 2, matching circuit 20 is connected in series with resistor 76 in one arm of bridge circuit 22. The other arms of bridge circuit 22 include resistor 78, resistor 80 and resistor 82. A balancing resistor 84 adjusts the bridge balance and is connected to output 22a. Reference output 22b is connected to the junction of resistors 80 and 82. When plug 64 is engaged in socket 70, switch 72 disconnects matching circuit 20 from resistor 76 and interposes in its stead the resistance of thermistor 60 in parallel with resistor 62.

In operation, either routinely or, if at any time the medical personnel operating the system are in doubt about the accuracy or functioning of the equipment, an immediate verification of operation and accuracy quickly can be made by unplugging probe unit 12 causing switch 72 to automatically connect matching circuit 20 into the bridge circuit whereupon the reference temperature appears on digital display 46 indicating that the system is operating properly or other than the correct temperature appears on digital display 46 indicating that there is a malfunction in the electronic thermometer unit 14.

The internal temperature reference circuit according to this invention is not restricted to use with thermistors and bridge circuits. For example, thermistor 60 may be replaced by a current responsive device or a voltage responsive device e.g. one or more temperature sensitive diodes 60', FIG. 3, whose voltages vary proportionally in response to changes in temperature to which they are exposed. The voltage at point 90, the junction between diodes 60' and resistor 92, is proportional to the temperature being sensed by the probe unit so that the variations in temperature are reflected by point 90 and on output 22'a as changes in voltage not impedance. In such an arrangement matching circuit 20 would provide a voltage representative of a predetermined temperature being sensed by diode 60'.

Other embodiments will occur to those skilled in the art and are within the following claims:

What is claimed is:

1. An electronic thermometer system comprising:
a temperature sensing probe unit having an electrical characteristic which varies as a function of the temperature to which it is exposed;
an electronic thermometer unit including a bridge circuit responsive to said probe unit to provide an electrical signal representative of temperature;
an internal temperature reference circuit including a probe matching circuit permanently located in said bridge circuit in said thermometer unit having the same said characteristic as said probe unit and initially settable to permanently match said characteristic of said probe unit at a predetermined test temperature; and a switching mechanism, located in said thermometer unit, for selectively interconnecting said probe matching circuit with said bridge circuit in place of said probe unit; and
a digital display device included in said thermometer unit for displaying, in response to the interconnection of said probe matching circuit with said bridge unit, said test temperature when said thermometer unit is operating properly and another temperature when said thermometer unit is operating improperly.

2. The electronic thermometer system of claim 1 further including means for releasably interconnecting said thermometer unit to said probe unit, said switching mechanism being responsive to said means for releasably interconnecting for connecting said probe matching circuit with said thermometer unit when said probe unit is disconnected from said thermometer unit.

3. An electronic thermometer system comprising:
a temperature sensing probe unit whose impedance varies as a function of the temperature to which it is exposed;
an electronic thermometer unit including a display device for displaying temperature and a bridge circuit responsive to said probe unit to provide an electrical signal representative of temperature;
an internal temperature reference circuit including a probe matching circuit permanently located in an arm of said bridge circuit in said thermometer unit and having its impedance initially settable to permanently match the impedance of said probe unit at a predetermined test temperature;
means for releasably interconnecting said thermometer unit with said probe unit;
a switching mechanism, located in said thermometer unit and responsive to said means for releasably interconnecting said thermometer unit and said probe unit, for disconnecting said probe matching circuit from said bridge circuit only when said probe unit and thermometer unit are interconnected and for reconnection of said probe matching circuit into said bridge circuit upon disconnection of said probe unit from said thermometer unit to display said test temperature when said thermometer unit is operating properly and another temperature when said thermometer unit is operating improperly.

\* \* \* \* \*